2,177,670

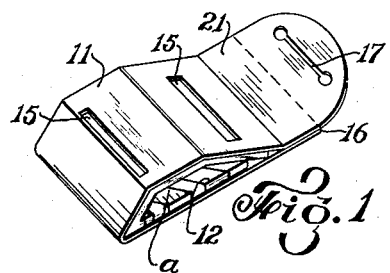
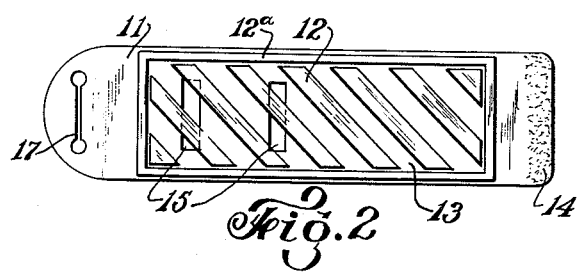
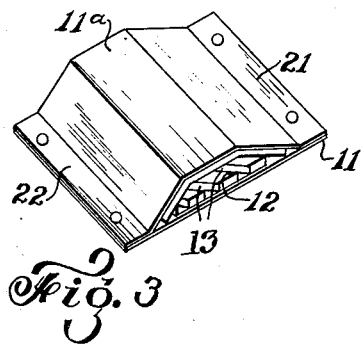
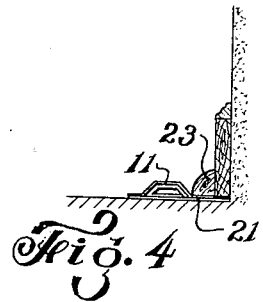
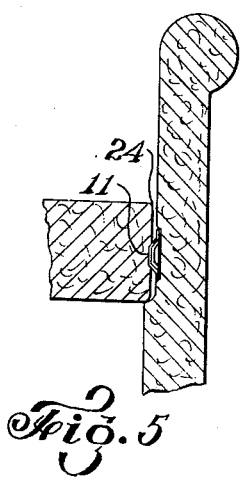
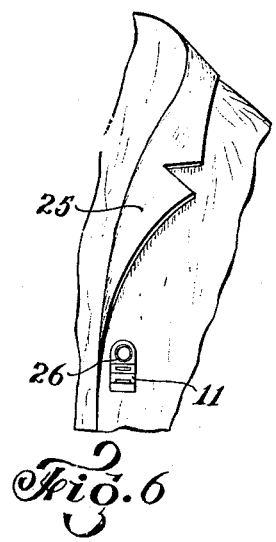
INVENTOR
HAROLD T. PEIRSON.
ATTORNEY Patented Oct. 31, 1939

UNITED STATES PATENT OFFICE 2,177,670

INSECT TRAP

Harold T. Peirson, Brooklyn, N. Y.

Application November 26, 1937, Serial No. 176,423

2 Claims. (Cl. 43—107)

This invention relates to insect traps and is particularly adapted for trapping and destroying the common clothes moths which are exceedingly destructive. These moths are yellowish, or buff, in color and fly lazily in darkened corners or out of the range of bright lights. Moths are propagated by the female on the wing seeking a place to deposit her eggs which may run from one hundred to three hundred eggs for a generation; the parent dies after the egg laying operation and the eggs hatch in from four to eight days in the summer time and from three to four weeks in colder weather. The destruction is caused by the larvae which requires from fifty days to thirty-six months to complete their development.

Clothes moths feed upon animal substances such as wool, hair, fur, feathers and articles manufactured from these materials. The larvae crawls readily and spins a shelter in which it conceals itself. At certain stages of its growth it is transparent and it assumes the color of the fabric upon which it is resting and feeding so that it is difficult to detect at this period.

The purpose of the present invention is to destroy the moth in the larvae stage by means of a trap which is inexpensive to make and which can be destroyed at intervals corresponding to the breeding period, which is sanitary and can be used in a closet, at the base of the floors or other places where moths are likely to breed.

The trap comprises a cover of cardboard or other suitable material which is coated on the inside with a sticky adhesive and is provided with pads of wool or animal fibre which may be impregnated with a substance that attracts the female moth. This cover is so folded as to provide a crevice or opening through which the moth crawls seeking a place to deposit its eggs. The parent moth is entangled by the adhesive and cannot escape. As soon as the larvae begin to crawl within the enclosure they are also entangled by the adhesive and die.

The pads are preferably made from dark material and the enclosure is darkened by the cover which makes an attractive nesting place for the moth. The device is made in a convenient size and with a tab whereby it may be attached to the button on a garment, to a crevice in the upholstery of furniture or to seams in the floor or in the walls. The cover completely encloses the adhesive in the pad so that the device can be handled without smearing and without injuring the garments on which it may be used. The cover is preferably made to enclose a tapering space into which a moth prefers to crawl prior to laying its eggs. The space is smaller than the moth so that it can squeeze itself in and be subject to pressure above and below. After use it may be burned or destroyed and for this reason it is preferably made from burnable material. The invention will be more particularly understood from the following specification and the accompanying drawing, in which:

Fig. 1 is a perspective view of one form of trap with a tab at one end;

Fig. 2 is a developed view of the interior of the trap shown in Fig. 1;

Fig. 3 is another form of trap shown in perspective which may be applied at the base of the floor;

Fig. 4 shows an application of the trap applied at the half round between the floor and the wall;

Fig. 5 is an elevation of an upholstered seat showing the trap applied at a crevice in the upholstery; and Fig. 6 shows the trap applied to a button of a garment.

In the drawing, 11 is the base which is made from sheet stock and may be metal or cardboard but is preferably made from an inexpensive material that may be burned or readily destroyed. This back or base is coated on one side with a sticky adhesive which remains sticky and upon the adhesive pads are provided as indicated at 12 of animal fibre, preferably wool, and which may be provided with a small spot of grease to attract the moths. The space between the pads at 13 leaves exposed the adhesive surface which entangles the insects. The pads are preferably made from a dark or black material and are applied to the surface in a tortuous manner so that an insect crawling over the surface would encounter the adhesive. The pads 12 may be enclosed in a marginal pad 12a and these pads may be set back slightly from the edge so that an insect could not crawl over the edge without engaging the adhesive surface. The end 14 is provided with a gum or adhesive which is secured to the opposite end at 16 when the device is folded as in Fig 1. The tab end is provided with a buttonhole slot at 17 by which the device may be supported.

When this device is folded as in Fig. 1, a crevice is provided at a which has a dark interior and which has an entrance small enough to attract the moths and preferably small enough to engage the moth above and below as it seeks shelter in the material. Ordinarily, moths are attracted to the device by the wool pads and the grease or lure thereon and they may crawl over the outer surface instead of finding the entrance at *a*. In this case apertures are provided at 15 in the cover through which the moth can crawl out of the light and into the dark interior. The enclosure tapers towards the edges as indicated in Fig. 1 so that as the moth enters these dark edges it is subject to pressure above and below.

It is intended that the trap shall be periodically replaced so as to destroy the eggs and larvae therein and which could not readily be detected from inspection. For this purpose it will be noted that the outer cover protects and conceals the fibre pads, the adhesive and the larvae that may have accumulated therein and it may be removed and destroyed in a sanitary and convenient manner.

The construction in Fig. 3 shows a base 11 with the pad 12 and upon which the cover 11*a* is placed having tabs 21 and 22 by which it may be placed on the floor, as in Fig. 4, for instance, with the tab under the half round 23 at the corner of the wall and the floor or it may be placed in the seam 24, Fig. 5, of the upholstered furniture. There appears to be some advantage in constructing the device as in Figs. 1 and 3 with the raised ridge in the centre upon which the moth alights and crawls. The application in Fig. 6 shows the trap 11 applied to the button 26 on the garment 25.

In the various forms of the device shown it is the purpose to provide an enclosure that is substantially shielded from the light and which contains a bait, interspersed with an adhesive to attract the insect at the egg laying period and it may be used for the destruction of insects that lay their eggs under these conditions. The common house moth when on the wing does not, itself, consume any animal products, its function is to lay eggs and the main object of this invention is to trap the larvae produced from these eggs, as the moth dies after the egg laying operation. This larvae is difficult to detect in its early stages. When it matures in a trap, it is isolated, it cannot spread and its ability to crawl around is arrested as soon as it encounters the adhesive, thereby leading to its destruction. The trap destroys the larvae and retains them until it is convenient to replace the trap with another one. The parent moth becomes entangled in the first trap entered and cannot flit from place to place.

The adhesive may comprise rosin, gum, castor oil, glycerine and a poison such as arsenic, or any commercial adhesive that remains "tacky" and does not dry out may be used. The pads may contain an odorant to attract the moth and may contain a poison or insecticide to destroy the larvae.

Having thus described my invention, I claim:

1. A moth trap comprising a cardboard cover enclosing a tapered space into which the moth can squeeze, said cover having an adhesive on its inside and having pads of animal fibre spaced on the adhesive.

2. A moth trap comprising a cardboard cover enclosing a darkened, tapered space into which the moth can squeeze, with an opening to said space, said cover having an adhesive on its inside and having pads of animal fibre spaced from each other and from the edge of the cover on the adhesive surface.

HAROLD T. PEIRSON.